Dec. 9, 1958 D. D. WALTSCHEFF 2,864,017

INDUCTO-MOTIVE POWER APPARATUS WITH A PLURALITY OF ROTORS

Filed Nov. 28, 1955 4 Sheets-Sheet 1

INVENTOR.
Dimo Dimitroff Waltscheff
BY Robert E. Burns
Attorney

Dec. 9, 1958     D. D. WALTSCHEFF     2,864,017
INDUCTO-MOTIVE POWER APPARATUS WITH A PLURALITY OF ROTORS
Filed Nov. 28, 1955     4 Sheets-Sheet 2

INVENTOR.
Dimo Dimitroff Waltscheff
BY
Robert E. Burns
Attorney

Dec. 9, 1958  D. D. WALTSCHEFF  2,864,017
INDUCTO-MOTIVE POWER APPARATUS WITH A PLURALITY OF ROTORS
Filed Nov. 28, 1955  4 Sheets-Sheet 3

INVENTOR.
Dimo Dimitroff Waltscheff
BY
Robert E Burns
Attorney

Dec. 9, 1958  D. D. WALTSCHEFF  2,864,017
INDUCTO-MOTIVE POWER APPARATUS WITH A PLURALITY OF ROTORS
Filed Nov. 28, 1955  4 Sheets-Sheet 4

INVENTOR.
Dimo Dimitroff Waltscheff
BY Robert E. Burns
Attorney

United States Patent Office 2,864,017
Patented Dec. 9, 1958

2,864,017

INDUCTO-MOTIVE POWER APPARATUS WITH A PLURALITY OF ROTORS

Dimo Dimitroff Waltscheff, New York, N. Y.

Application November 28, 1955, Serial No. 549,331

22 Claims. (Cl. 310—126)

This invention relates to induction motors generally, and to induction motors with very high starting torque, and low starting current and speed control in particular.

As is known since the invention of the induction motor, one of the main problems was to increase its starting torque and to decrease the current drawn during the starting period.

Special difficulties are encountered in the solution of this problem for squirrel cage induction motors. Among the many proposed solutions, there are only a few which have gained practical use, but none of them is a completely satisfactory solution. One of them is the double- or multi-cage rotor. In that type of squirrel cage motor there can be achieved an increase of the starting torque practically up to the breakdown torque, and at the same time a substantial decrease of the starting current without too much sacrificing of the rated slip. This type of induction motor has gained a wide practical use, especially in cases where a high starting torque is required.

There are, however, many cases where a starting torque greater than the maximum torque of an electrical motor, sufficient to carry the normal load, is required. Such is the case with the electrically driven conveyances. In such a case, the problem is solved by choosing an oversized motor or by the use of gears, which leads to higher expenses and other difficulties.

Another problem is the speed control with alternating-current motors, especially with induction squirrel cage motors.

One object of this invention is therefore to provide new types of induction motors, the starting torque of which may exceed to a great extent the breakdown torque of a conventional induction motor of the same size, and the starting current of which may be kept very low. Another object is to provide new types of induction motors with full-range speed controls, from zero speed to full speed, having a good average efficiency. Still another object is to provide a method of forming certain newly incorporated parts of the novel induction motors.

With these and other objects in view, which will become apparent in the following detailed description, the present invention will be clearly understood in connection with the accompanying drawing in which.

The operation of the novel type of induction motors according to the present invention is based on the principle of the "intermediate rotors" as described and defined hereinafter. The intermediate rotors, whose arrangement may be concentrical or parallel, rotate separately from each other which permits the use of progressively proportioned speed-reducing and torque-increasing gear trains and makes possible the achievement of very high torque and also full-range speed control of induction motors.

Figure 1:
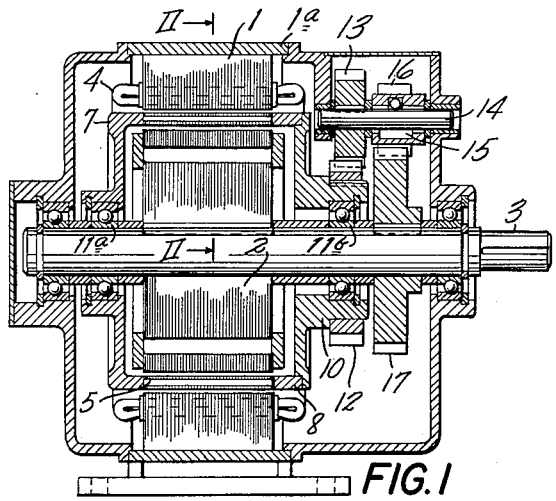
Fig. 1 illustrates a squirrel cage induction motor in longitudinal section, with one conventional rotor, one intermediate rotor and torque-increasing gears.
Figure 2:
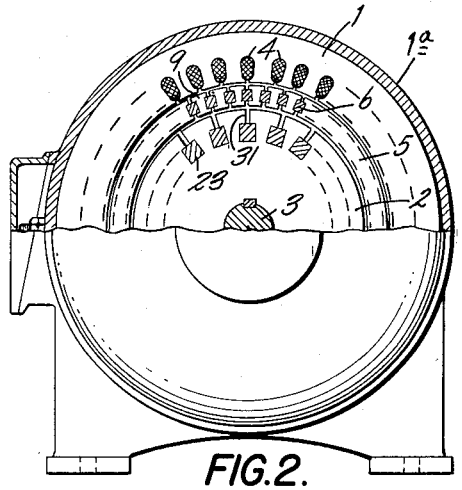
Fig. 2 illustrates the same squirrel cage induction motor in cross-section on line II—II of Fig.1.

Figs. 1 and 2 illustrate an induction motor with one intermediate rotor. At 1 there is shown the motor stator, supported on the motor housing 1a. A conventional squirrel cage rotor 2 is keyed to the motor shaft 3. The stator 1 is provided with a single-, two-, or multi-phase winding 4 to create, when energized, a rotating magnetic field. Rotor 2 is preferably a low-resistance squirrel cage rotor.

In the enlarged gap between stator 1 and rotor 2 is arranged an intermediate rotor 5. The intermediate rotor 5, having the form of a hollow cylinder, may be of cast, welded, bolted, or other construction and consists of bars 6 and end rings 7 and 8, all electrically conductive and connected together, constituting a preferably high-resistance squirrel cage, and of lamination segments 9 of magnetically permeable material. The lamination segments 9 are firmly placed between the bars 6 and end rings 7 and 8 to form segment cores. The end ring 7 is extended to serve as a housing for a ball bearing 11a supporting the intermediate rotor 5 at one end. The ring 8 is preferably keyed to a flange 10 which in turn is used as a housing for a second ball bearing 11b supporting the intermediate rotor 5 at the other end. Flange 10, on its outer end, carries a gear 12 which meshes with a gear 13, keyed to an auxiliary shaft 14. Coupled to the same shaft 14 through a unidirectional coupling such as an overrunning clutch 15 is a gear 16 which meshes with a gear 17. The gear 17 is keyed to output shaft 3. The over-running clutch 15 may also be provided on any one of the other gears 12, 13 or 17. As is seen from Fig. 1, the gears 12, 13, 16 and 17 are speed-reducing and torque-increasing gears.

When the motor is started by energizing the winding 4, and the intermediate rotor 5 and the principal rotor 2 are standing still, the frequency in both rotors is equal to the frequency in the stator. Because of the skin effect principle, the induced currents in the rotor cages concentrate mainly in the intermediate rotor cage, which is preferably of high resistance the same as the outer cage, in a double-cage, single-rotor induction motor. The resistance of the intermediate rotor cage should be chosen so as to achieve the maximum possible torque.

During the starting period the intermediate rotor 5, supported on the bearings 11a and 11b, thus rotates with higher speed than rotor 2. Rotation of the intermediate rotor 5 is transmitted by gears 12, 13, 16 and 17 and the overrunning clutch 15 to shaft 3 at a speed equal to the speed of rotor 2. At the same time the torque of the intermediate rotor 5 is also transmitted by the same gears to the shaft 3, increased in the same ratio as the speed is reduced. The rotor 2 rotates at the same speed as the shaft 3 to which it is keyed.

During starting the intermediate rotor 5 develops the maximum starting torque and the corresponding starting torque of shaft 3 will be a multiple of the maximum torque as determined by the total reducing ratio of the gears. During the starting period, the rotor 2 also exerts a torque which is directly transmitted to shaft 3 and added to the torque transmitted by gears 12, 13, 16 and 17 from the intermediate rotor 5. When the intermediate rotor 5 reaches synchronous speed, the torque is zero. Then the overrunning clutch 15 releases and the intermediate rotor 5 rotates freely. At this moment, rotor 2, which must develop sufficiently high torque to continue rotation, takes over the full load.

In the case of a varying load, any increase thereof causes the slip of the rotor 2 to increase. When the slip becomes so great that the ratio of synchronous speed to speed of rotor 2 is equal to the total reduction ratio of gears 12, 13, 16 and 17, the overrunning clutch 15 engages again, and the intermediate rotor 5 starts to exert increased torque upon shaft 3, thus supplementing the torque supplied by rotor 2, so that the combined torque matches the increased load. The total reduction ratio of the gears 11, 12, 16 and 17 can be chosen so that with increasing slip the torque increases constantly and reaches its maximum when the rotors are standing still.

In case the desired increase of the starting torque above the breakdown is not greater than the ratio of rated slip of rotor 2 to synchronous speed, the overrunning clutch 15 shown in Fig. 1 may be entirely eliminated and gear 16 rigidly keyed to shaft 14. Then, reversing the direction of rotation can be achieved merely by switching the phases or winding ends on windings 4.

Figure 3:
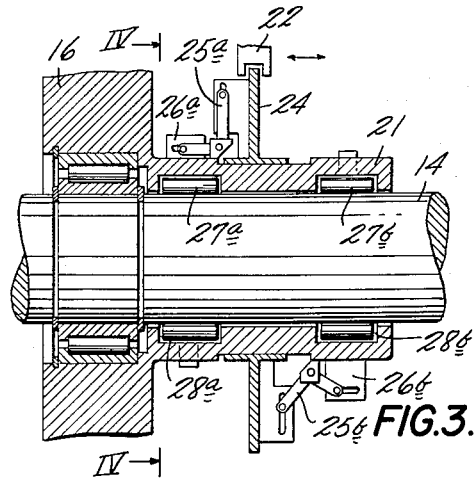
Fig. 3 illustrates a double-action overrunning clutch in central longitudinal section.
Figure 4:
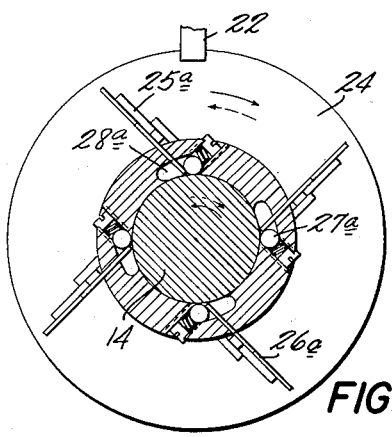
Fig. 4 illustrates the same double-action overrunning clutch in cross section on the line IV—IV of Fig. 3.

In case the desired increase of the starting torque above the breakdown is greater than the ratio of rated slip of rotor 2 to synchronous speed, the overrunning clutch 15 may not be eliminated. Then, if the motor should also be reversible in its direction of rotation, the overrunning clutch 15 should be replaced by a double-action overrunning clutch, such as is shown in Fig. 3 and Fig. 4. To reverse the direction of rotation, it will be necessary not only to switch phases or winding ends on windings 4, but also to reverse the double-action overrunning clutch.

Figs. 3 and 4 illustrate an embodiment of a double-action overrunning clutch wherein gear 16 should rotate freely in one direction and lock itself to shaft 14 when starting to rotate in the opposite direction in respect to that shaft. At 22 there is indicated a fork which can be moved in one or the other direction, as the arrow 23 shows, and straddles the disk 24. Upon a shift of fork 22 in one or the other direction, the disk 24 slides along neck 21 of gear 16 and actuates levers 25a, 25b. The levers 25a for example, push in the blocking plates 26a of one of the clutch halves while the lever 25b pulls out the blocking plates 26b of the other clutch half, so that slots 28a of one of the clutch halves become closed and slots 28b of the other half are opened. The rollers 27a, 27b are thus either enabled to turn or prevented from turning in their slots 28a and 28b so one clutch half becomes activated and the other inactivated.

In the position illustrated in Fig. 4, for example, the clutch half there shown (the left-hand one in Fig. 3) is inoperative since the elements 27a thereof are prevented by the plates 26a from moving toward the narrow end of the corresponding slots 28a, thus this clutch half allows free rotation in either sense; at the same time the other clutch half, whose blocking plates 26b have been withdrawn, is effective to couple the parts 14—16 together for simultaneous rotation upon relative moment of these parts in the sense indicated by the solid arrows in Fig. 4, while maintaining the system free-wheeling in the opposite sense (dotted arrows).

Figure 5:
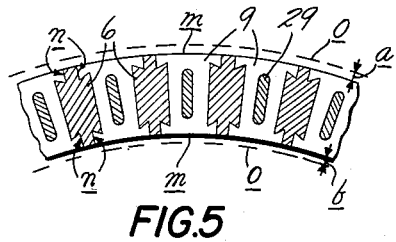
Fig. 5 illustrates a partial cross-section through an intermediate rotor.

Fig. 5 illustrates a suitable mode of manufacture for an intermediate rotor, in the form of a hollow cylinder. Before the cage is formed, the lamination segments 9 are held together as one piece by the portions a and b shown between the dotted lines o and the solid lines m. The solid lines m represent the intended inside and outside finished surfaces of the intermediate rotor. After the forming of the cage by casting, welding, etc., the bars 6 dovetail with the intervening portions and hold them firmly in place, and the portions a and b may now be cut out up to edges m, thereby splitting the laminated body into separate segments. The segments 9 and the bars 6 are given special interlocking forms in order to stay firmly in place against centrifugal, inertial and other forces. For a further increase of stability, the laminations 9 may also be welded with non-magnetic material across the edges n on the inside or on the outside of the rotor, before the rotor is completed. This will integrally unite all segments 9 around the entire circumference of the rotor. The segments may be also tied to the end rings 7, 8 by preferably radially arranged insulated strips 29, or by suitable bolts or tubes. There may be used a resinous bonding agent to secure them together.

Figure 6:
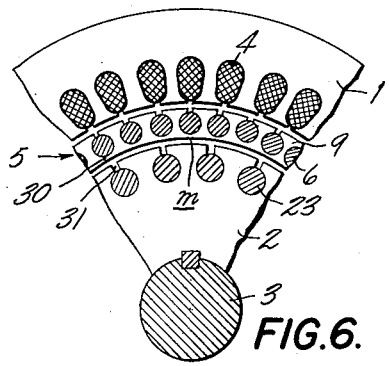
Fig. 6 illustrates a partial cross-section through another induction motor with one conventional rotor and one intermediate rotor having a different arrangement of the bars and slots.

Fig. 6 illustrates another embodiment of the invention with an intermediate rotor, the same reference numeral as in Figs. 1 and 2 having been used to designate similar parts. The characteristic feature here is that the laminations 9 are not split into segments all around the circumference of rotor 5, but are merged into continuous laminated portions extending in full circle between bars 6 and the inner rotor edge m. The connecting portion 30 should be kept as narrow as possible, but without impairing the stability of the rotor.

Because the portions 30 are nevertheless a low reluctance path for the magnetic flux, it is desirable to reduce the reluctance of the principal rotor 2 by making the slots 31 of the rotor 2 very short; this in turn decreases the diameter of the motor.

The intermediate rotor may be built also from a solid, massive, electrically and magnetically conductive material such as solid iron, steel, nickel alloy or the like.

Figure 7:
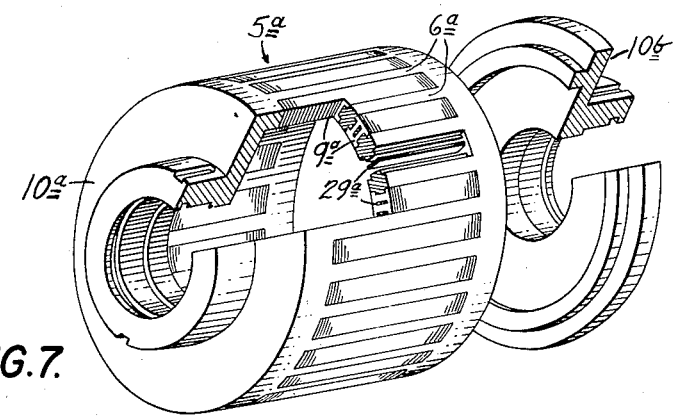
Fig. 7 is an isometric view (partly broken away) of an intermediate rotor, squirrel cage type.

Fig. 7 illustrates an intermediate rotor 5a which is like the rotor 5 of Figs. 1 and 2 except that annular flanges 10a and 10b are provided respectively at both ends of the rotor so that the rotor is symmetrical about a central transverse plane. The flanges 10a and 10b accommodate anti-friction bearings supporting the rotor 5a on the shaft and make it possible to mount the gear 12 of Fig. 1 on either end of the rotors. Fig. 7 also illustrates a modified interlocking construction of the bars 6a and lamination segments 9a with associated insulating strips 29a.

Figures 8, 9:
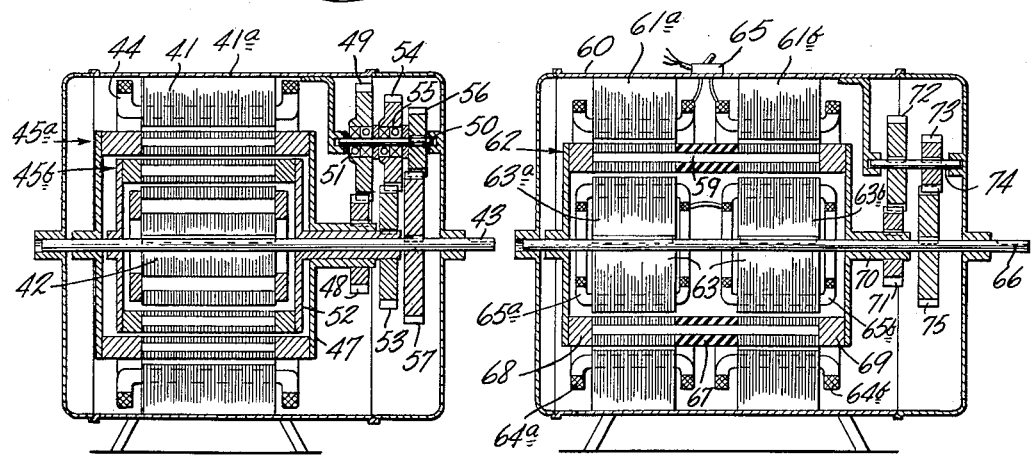
Fig. 8 illustrates schematically in central longitudinal section, the same type of squirrel cage induction motor as shown in Fig. 1 but including a stator, a conventional rotor, two intermediate rotors, and torque-increasing gears.
Fig. 9 illustrates schematically, in central longitudinal section, another type of induction motor with double stator, one double conventional rotor, one intermediate rotor, and torque-increasing gears.

Fig. 8 illustrates a reversible induction motor similar to that shown in Fig. 1 but having two intermediate rotors. The stator 41 is supported on the housing 41a and provided with preferably composite windings 44 to produce, when energized, a rotating magnetic field. At 42 is shown a preferably low-resistance cage rotor, keyed rigidly to the motor shaft 43. In the air gap between the stator 41 and the rotor 42 are arranged two intermediate rotors 45a and 45b, whose construction and mounting are similar to those of intermediate rotor 5 of the motor shown in Figs. 1 and 2.

The intermediate rotor 45a is provided at one end with a flange 47 carrying a gear 48 which meshes with a gear 49. Gear 49 is connected to auxiliary shaft 50 through a double-action overrunning clutch 51, similar to that shown in Figs. 3 and 4. The intermediate rotor 45b is likewise provided at one end with a flange 52 carrying a gear 53, which meshes with gear 54. This gear 54 is also connected to shaft 50 through a second double-action overrunning clutch 55. Furthermore, to shaft 50 is rigidly keyed a gear 56, which meshes with a gear 57 that is keyed rigidly to motor output shaft 43. The resistance of the rotor 45a is so chosen as to develop the maximum starting torque. The resistance of the rotor 45b is chosen at an intermediate value between those of rotors 45a and 42.

With this type of induction motor, with two intermediate and one conventional rotor, there may be achieved a starting torque far above the breakdown torque of a conventional induction motor of the same size. Or, with the selection of a moderate total ratio for the gears 48, 49, 53, 54, 56 and 57 and of suitable resistance values for the rotor cages, an induction motor may be built with full-range speed control, from zero speed to maximum speed, with a smooth, continuously rising torque characteristic, and good average efficiency The double-action overrunning clutches insure also the reversibility of the motor, which makes it very convenient for transport conveyances, such as trains, electric cars, etc.

Fig. 9 illustrates another type of induction motor with intermediate rotor, having a dual stator which is supported on the motor housing 60 and consist of a pair of identical sections, 61a and 61b, provided respectively with single-, two- or multi-phase windings 64a and 64b, and also a dual rotor 63 whose identical sections 63a and 63b are keyed rigidly to the motor shaft 66.

The rotor sections 63a and 63b are provided with separate, preferably low-resistance, heavy-wire windings 65a and 65b, which are electrically 180° out of phase. In the air gap between stator and rotor there is arranged an intermediate rotor 62, construction of which is similar to the construction of the intermediate rotor 5 shown in Fig. 1, with the difference that the intermediate rotor 62 has a central section 67, free of laminations. The free space between the bars 59 of this section 67 may be filled up with insulating material to prevent short circuit between the bars and to increase the rotor stability.

Here, also, the end ring 68 may be used as a supporting bearing for the intermediate rotor 62. The end ring 69 is connected to the flange 70 which also may be used as a supporting bearing. On its outside end, the flange 70 carries the gear 71 which meshes with gear 72. Gears 72 and 73 are keyed rigidly to a shaft 74. Gear 73 meshes with a gear 75 which is keyed rigidly to the motor shaft 66.

Furthermore, one of the two stator windings 64a and 64b is adapted to be phase-shifted in respect to the other by 180°, by switching its wire ends by a conventional switch 65. This switch can be designed as a manual or an automatic switch, and may be used also for disconnecting purposes.

When the motor is started and the conventional rotor 63 and the intermediate rotor 62 are standing still, the stator windings 64a and 64b draw a heavy current which may be used directly to operate the switch 65. Such operation of the switch connects the stator windings 64a and 64b in phase with each other. This induces a current flow in the cage of the intermediate rotor 62—the starting rotor—but not in windings 65a and 65b of the rotor 63 which are 180° out of phase. Thus the currents in the latter windings flow in opposite directions and cancel each other. Only the rotor 62 will, therefore, be working. The resistance of the cage of the intermediate rotor 62 may be so chosen that it develops the maximum torque.

Through gears 71, 72, 73 and 75 the torque is further increased. Rotor 63 is driven through gears 71, 72, 73 and 75 at a speed lower than that of the intermediate motor 62. The progressive acceleration of the rotors reduces the stator current until at a given speed, the switch 65 is reversed, either by hand or automatically. This reversal may be carried out quickly or gradually, smoothly or in steps. Thereby the stator windings 64a and 64b are energized in phase opposition and the induced currents in the bars of the intermediate rotor 62 under both stator sections 61a and 61b flow in opposite directions and cancel each other so that no torque is exerted by this rotor.

In windings 65a and 65b of the principal rotor 63, which are chosen with low resistance and are electrically out of phase by 180°, current flows in one direction during normal operation so that torque is developed. The principal rotor 63 takes over the full load. As long as the load is normal, only the rotor 63 is working. The intermediate rotor 62 is now rotating above the rated speed of the motor and produces no electromagnetic reaction. If the load increases, the slip, and with it the current in the stator increases. When this current reaches a given value, the switch 65 reconnects the stator windings 64a and 64b in phase. The intermediate rotor 62 is thus again activated and the rotor 63 deactivated. The intermediate rotor 62 takes over and, with lower speed but higher torque, overcomes the increased load.

A change in the direction of rotation with this type of induction motor can be achieved by merely reversing the rotating magentic field in the stator, through a reversal of the stator windings 64a and 64b.

It is possible to design the inner rotor 63 as the starting rotor and the intermediate rotor 62 as the principal rotor, but, in that case the ratio of gears 71, 72 and 73, 75 must be reversed.

Figure 10:
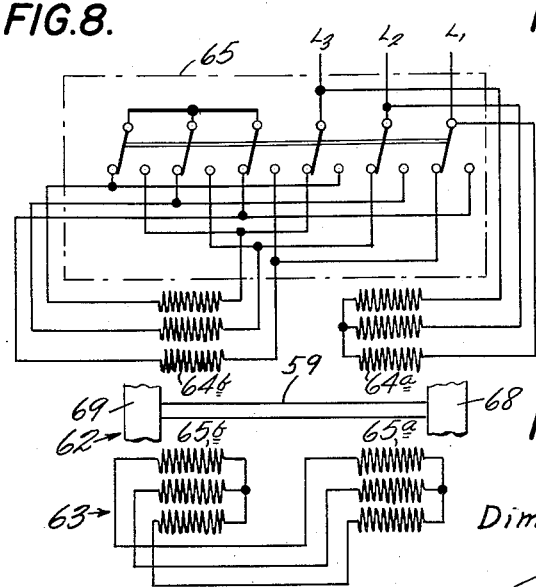
Fig. 10 is a diagram illustrating a circuit for switching the stator windings of the motor of Fig. 9.

Fig. 10 illustrates schematically a circuit for connecting the stator windings 64a and 64b either in phase with one another or 180° out of phase as described above. The circuit comprises 3-phase power supply leads L1, L2 and L3 and a multiple switch 65. When the ganged blades of the switch are in the right hand position as shown, the stator windings 64a and 64b are connected in phase with one another. When the switch blades are in the left hand position, the stator windings are connected 180° out of phase. The windings 65a and 65b of the rotor 63 are interconnected as shown. One bar 59 and portions of the end rings 68 and 69 of the intermediate rotor 62 are also illustrated in Fig. 10.

In all of the illustrated embodiments, the coupling between inner and intermediate rotors has been shown only as conventional spur gears. Since in all cases the gears are constantly meshed, they may also be replaced by planetary gears.

Figure 11:
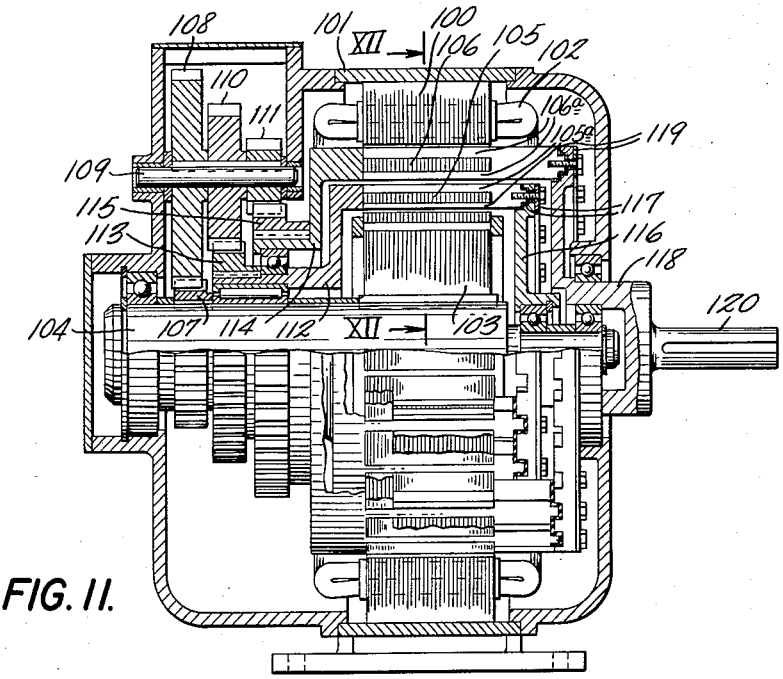
Fig. 11 illustrates in greater detail, in central longitudinal section, an induction motor with loop-type intermediate rotors.
Figure 12:
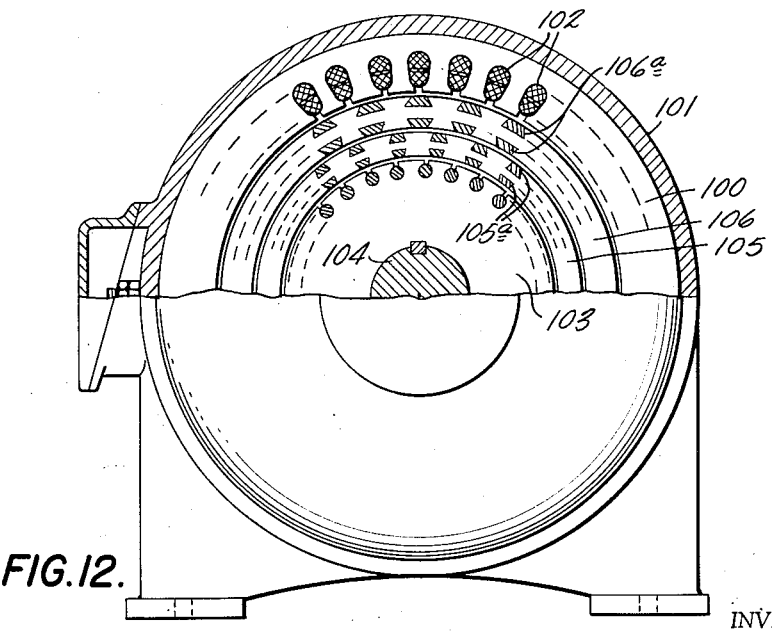
Fig. 12 illustrates the same induction motor in cross-section on line XII—XII of Fig. 11.

Figs. 11 and 12 illustrate in detail another type of induction motor with intermediate rotors. The new characteristic feature of this type of induction motor is the use of short-circuited metal loops as electrically conductive parts of the rotors. The advantage of this type induction motor is that the rotor with the lowest electrical resistance is the one closest to the stator and that to reach this rotor, which is the one performing useful work most of the time, the flux has to traverse only one air gap. Another advantage of this type of induction motor is that also the overrunning clutches which appear in the motors illustrated in Figs. 1 and 2, as well as in Fig. 8, may be entirely eliminated.

The motor stator 100 is supported on the motor housing 101 and provided with a single-, two-, or multi-phase winding 102. A conventional, preferably high-resistance, squirrel cage rotor 103 is keyed to shaft 104. In the enlarged gap between stator 100 and rotor 103 are two intermediate rotors 105 and 106. The intermediate rotors 105 and 106, having the form of hollow cylinders, may have a cast, welded, bolted, or other construction. Each one of them consists of individual loops of electrically conductive material and an annular laminated core of magnetically permeable material, each loop constituting a closed electrical circuit of relatively high inductivity, linking the rotor laminated core.

The annular laminated core is provided on its inside and outside with slots. In these slots lie the loops linking the laminated core. For better mechanical support, the loops may be conductively interconnected on one side of the rotor core by a common end ring, but they must be insulated on the opposite side of the rotor in order not to constitute a short-circuited squirrel cage. To shaft 104 is keyed a gear 107, which meshes with a gear 108 keyed rigidly on auxiliary shaft 109. On the same auxiliary shaft 109 are also rigidly keyed gears 110 and 111. The end ring 112 of the intermediate rotor 105, which forms a unit with medium resistance loops 105a, is extended as a roller-bearing housing and carries the gear 113 which meshes with gear 110. On the opposite side, the loops 105a are mechanically joined to a common ring 116 but electrically insulated from one another and from the ring by insulation 117.

The end ring 114 of the intermediate rotor 106, which forms a unit with low-resistance loops 106a, is also extended as a bearing housing and carries gear 115 which meshes with gear 111. On the opposite side, the loops 106a are also mechanically joined to flange 118, which is extended as a motor output shaft 120. Loops 106a are insulated from one another and from the flange by the insulation 119.

When the motor is started by energizing the winding 102, and all rotors are standing still, the frequency of the voltages induced in them is equal to the frequency in stator winding 102. Because of the high impedance of the loops 106a and 105a, the greatest part of the magnetic flux cannot go through them but is forced to pass between them and through the air gaps, thus reaching the conventional rotor 103 almost in full force. The conventional rotor 103 being a high-resistance rotor, develops a high starting torque in response to the initially induced maximum-frequency currents. This torque is further stepped up at a high ratio by the reduction gears 107, 108, 111 and 115 which transmit it to the intermediate rotor 106 and through it to output shaft 120. At the same time the rotor 105 is driven by shaft 109, through gears 110 and 113, at a speed higher than that of rotor 106. With increasing speed of the rotors, the frequency in them decreases until the greater part of the magnetic flux is able to pass through the medium resistance loops of the intermediate rotor 105. The rotor 105 now exerts a high torque which is stepped up at a medium ratio by the reduction gears 113, 110, 111 and 115 and transferred by them to the intermediate rotor 106 and through it to output shaft 120.

With further increased speed there comes a moment when the conventional rotor 103 driven by the other rotors through gears 108 and 107 exceeds the synchronous speed and exerts a negative torque, but the latter is weak and practically negligible in view of the very small magnetic flux now traversing this rotor. With still further increases in the speed of the rotors, the frequency in rotor 106 decreases sufficiently that the greater part of the magnetic flux is able to pass through the loops of this intermediate rotor thereby activating it. Now the rotor 106 develops a high torque which is transmitted directly to output shaft 120. Depending on the reduction ratio of gears 113, 110, 111 and 115, the intermediate rotor 105 may now also exceed the synchronous speed and exert a negative torque which, however, will also be practically negligible.

In case of a varying load, any increase thereof will cause the slip of the rotor 106 to increase. When the load increase is so great that the torque supplied by the intermediate rotor 106 is insufficient to sustain it, the intermediate rotor 105 takes over and rotates the output shaft 120 at reduced speed but with increased torque. If the load increases further, the conventional rotor takes over, imparting the lowest speed but the highest torque to the output shaft 120. It is understandable that the transition from one speed to another occurs in a stepless, smooth and gradual manner.

The shaft 104 may be extended outside the motor housing as a second low-torque, high-speed output shaft. In this type of induction motor there may also be incorporated overrunning clutches in order that the rotors do not exceed the synchronous speed or a certain speed above it.

With this type of induction motor with loop-type intermediate rotors it is possible to realize a torque far above the breakdown torque of a conventional induction motor of the same size. Moreover, by the choice of a moderate overall step-down transmission ratio and suitable rotor resistances, an induction motor with full-range speed control can be built. The motor can have a smooth, constantly rising torque characteristic and a good average efficiency while being also reversible.

In this and in the preceding embodiments the speed of the motor can be controlled through a change of the applied voltage and/or of the applied frequency in the stator windings. Variations in the mode of interconnection of the leads of the stator winding (e. g. to increase the number of pole pairs) may be used in reverse and/or to reduce the rotor speed as is well known per se.

For the purpose of further increasing the starting torque, or improving the efficiency, the number of intermediate rotors in the various embodiments disclosed may be increased.

Figure 13:
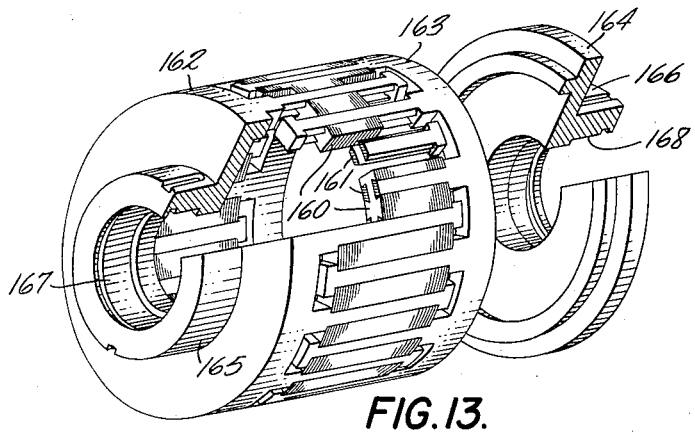
Fig. 13 is an isometric view (partly broken away) of a loop-type intermediate rotor.

Fig. 13 illustrates a typical loop-type intermediate rotor similar to the rotors 105 or 106 of Figs. 11 and 12, where, in order to eliminate the insulation 117, 119, the loops 161 are staggered so that alternate loops are integral with an end member 162 and intervening loops are integral with the ring 163 at the opposite end of the rotor. The loop 161 fits in channels formed in lamination core 160. An annular flange 165 projects axially from the end member while at the opposite end of the rotor there is an end plate 164 having an annular flange 166. The flange portion 165 and 166 are adapted to receive gears connecting the intermediate rotor with the motor shaft and are provided with internal recesses 167 and 168 to receive antifriction bearings.

Figure 14:
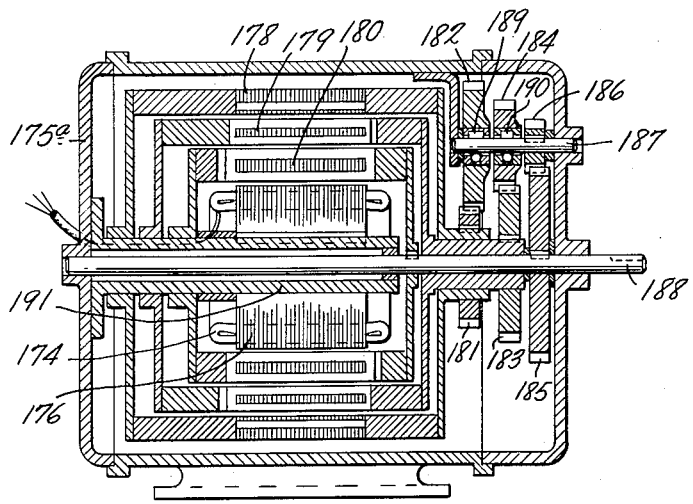
Fig. 14 is a longitudinal section illustrating an induction motor with loop-type intermediate rotors, surrounding the motor stator.

Fig. 14 illustrates an induction motor with three coaxial rotors as in Figs. 11 and 12 with the difference that the stator 176 is secured on a stationary hollow shaft 191 supported by the stator shell 175a and is surrounded by the rotors. The polyphase winding 174 is mounted on the outer portion of the stator. The outermost rotor 178 is a high resistance squirrel cage rotor which carries a gear 181 that meshes with a gear 182 on a countershaft 187. The intermediate rotor 179 is a medium resistance loop-type rotor carrying a gear 183 that meshes with a gear 184 on the countershaft. The innermost rotor 180 is a low resistance loop-type rotor keyed on motor shaft 188 which extends through the stationary hollow shaft 191 of the stator. The countershaft 187 is connected with the motor shaft 188 through gears 185 and 186. The gear ratios are selected so that the outermost rotor drives the motor shaft with the greatest torque and lowest speed, the intermediate rotor drives the motor shaft with intermediate torque and speed and the innermost rotor, being keyed directly to the motor shaft drives he shaft at highest speed and lowest torque. Gears 182 and 184 are coupled with the countershaft 187 by overrunning clutches 189 and 190 respectively to prevent rotors 178 and 179 from exceeding synchronous speed. Otherwise the construction and operation of the embodiment of Fig. 14 are like those of Figs. 11 and 12. An advantage of this embodiment is that the rotors are not limited in their dimensions.

While I have shown and described a number of embodiments of the present invention by way of example, it is understood that features of the illustrated examples are mutually interchangeable and that the invention is capable of other modifications within the scope of the present invention as defined by the foregoing objects and by the appended claims.

What I claim as new and useful, and desire to secure by Letters Patent, is the following:

1. Inducto-motive power apparatus comprising means for producing a rotating magnetic field, a plurailty of rotors coaxial with said field-producing means, said rotors being disposed in said field to be impelled directly by said field, output means, torque-converting members providing driving connections between said rotors and said output means with progressively proportioned speed ratios between the respective rotors and said output means, said rotors having magnetically permeable components and electrically conductive components providing paths with progressively proportioned path-to-path reluctance and regressively proportioned path-to-path magnetic reactance, whereby at low rotor speeds when the frequencies induced in the rotors are relatively high the flux of said rotating magnetic field concentrates in paths of highest reluctance and lowest magnetic reactance and thereby concentrates the impelling force of the field in the rotor which is connected to the output means with highest speed ratio delivering lowest output speed and highest output torque and a high rotor speeds when the frequencies induced in the rotors are relatively low the flux of said rotating magnetic field concentrates in paths of lowest reluctance and highest magnetic reactance and thereby concentrates the impelling force of the field in the rotor which is connected to the output means with lowest speed ratio.

2. Apparatus according to claim 1, wherein said driving connections comprise unidirectional coupling means adapted to transmit torque in one direction only.

3. Apparatus according to claim 2, further comprising means selectively operable to reverse said coupling means for operation in a reverse direction.

4. Apparatus according to claim 1, wherein said rotor which is connected to the output means with highest speed ratio is positioned between said field-producing means and said rotor which is connected to the output means with lowest speed ratio.

5. Apparatus according to claim 1, wherein said rotors comprise respectively short-circuited armatures of progressively reduced electrical resistance of said electrically conductive components, the electrically conductive components of the rotor connected to the output means with highest speed ratio having the highest resistance and the electrically conductive components of the rotor connected to the output means with lowest speed ratio having the lowest resistance.

6. Apparatus according to claim 5, wherein the electrically conductive components of at least one of said rotors comprise a squirrel cage.

7. Apparatus according to claim 5, wherein the electrically conductive components of at least one of said rotors comprise radially spaced concentric rings and a plurality of circumferentially spaced radially extending bars connecting said rings.

8. Apparatus according to claim 1, wherein the magnetically permeable components of at least one of said rotors form an annular body and the electricially conductive components comprise an array of short-circuited loops disposed in substantially radial planes and linking said annular body, said loops being electrically independent of one another so that current induced in one of said loops does not flow in another of said loops.

9. Apparatus according to claim 8, wherein said rotor which is connected to the output means with lowest speed ratio is disposed between said field-producing means and said rotor which is connected to the output means with highest speed ratio.

10. Apparatus according to claim 1, wherein the electrically conductive components of at least one rotor comprises windings.

11. Apparatus according to claim 10, wherein said field-producing means comprises two windings and means for energizing said windings selectively to produce rotating magnetic fields that are in phase with one another or are in opposite phase and said rotors comprise a rotor having two windings interconnected in opposite phase and a rotor having windings connected in phase.

12. Inducto-motive power apparatus comprising means for producing a rotating magnetic field, a plurality of rotors coaxial with said field-producing means, all of said rotors being disposed in said field to be impelled directly by said field, output means, torque-converting members providing driving connections between said rotors and said output means with different speed ratios between the respective rotors and said output means, said field-producing means being divided into sections, each producing a rotating magnetic field and shift means selectively interconnecting said sections and operable between a condition in which the fields produced by said sections are in phase with one another and a condition in which the fields produced by said sections are in opposite phase, one of said rotors having portions facing said sections of the field-producing means and having electrically conductive components of such portions interconnected in phase with one another, and another of said rotors having sections facing said sections of the field producing means and having electrically conductive components of one such rotor section connected in phase opposition to electrically conductive components of the other such rotor section, whereby when said shift means is conditioned to connect said field-producing sections in phase an impelling force is applied to said rotor with components in phase and when said shift means is conditioned to connect said field-producing sections in phase opposition an impelling force is applied to said rotor with sections in phase opposition.

13. Apparatus according to claim 12, wherein the electrically conductive components of the one of said rotors connected to said output means with higher speed ratio form a circuit having an electrical resistance higher than that of a circuit formed by the electrically conductive components of another of said rotors connected to said output means with a lower speed ratio.

14. Apparatus according to claim 13, wherein the electrically conductive components of at least one of said rotors comprises a squirrel cage.

15. Apparatus according to claim 12, wherein said driving connections comprise unidirectional coupling means adapted to transmit torque in one direction only.

16. Apparatus according to claim 15, further comprising means selectively operable to reverse said coupling means for operation in a reverse direction.

17. Apparatus according to claim 1, wherein there are at least three of said rotors.

18. In an inducto-motive power apparatus, a rotor comprising a body of magnetically permeable material of annular cross section centrally symmetrical about an axis, an array of electrically conductive loops located in substantially radial planes and closed around eccentric portions of said body, said loops being disposed symmetrically with respect to said axis and being electrically independent of one another, so that current induced in one of said loops does not flow in another of said loops and electrically conductive supporting means integral with said loops.

19. Inducto-motive power apparatus comprising means for producing a rotating magnetic field, a plurality of rotors coaxial with said field-producing means, all of said rotors being disposed in said field to be impelled directly by said field, output means, torque-converting members providing driving connections between said rotors and said output means with different speed ratios respectively, at least one of said rotors comprising a body of magnetically permeable material of annular cross section centrally symmetrical about an axis, and a circular series of electrically conductive loops located in substantially radial planes and closed around eccentric portions of said body, said loops being disposed symmetrically with respect to said axis and being independent of one another, so that current induced in one of said loops does not flow in another of said loops.

20. Induction machine according to claim 1, wherein said means for producing a rotating field comprise a stator, provided with a polyphase winding to produce a rotating magnteic field when energized.

21. Induction machine according to claim 12, wherein said means for producing a rotating magnetic field comprise a stator divided into sections each provided with polyphase windings to produce phase displaceable rotating magnetic fields in said sections when energized.

22. Induction machine according to claim 19, wherein said means for producing a rotating magnetic field comprise a stator provided with a polyphase winding to produce a rotating magnetic field when energized.

References Cited in the file of this patent

UNITED STATES PATENTS

| | | |
|---|---|---|
| 138,855 | Carter | May 13, 1873 |
| 802,632 | Gill | Oct. 24, 1905 |
| 912,144 | Mavor | Feb. 9, 1909 |
| 1,708,909 | Spencer | Apr. 9, 1929 |
| 1,769,652 | Smith | July 1, 1930 |
| 2,296,776 | Douglas | Sept. 22, 1942 |
| 2,550,571 | Litman | Apr. 24, 1951 |

FOREIGN PATENTS

| | | |
|---|---|---|
| 288,329 | Great Britain | Jan. 17, 1929 |
| 867,287 | France | July 15, 1941 |